United States Patent
Hasegawa et al.

(10) Patent No.: US 10,248,335 B2
(45) Date of Patent: Apr. 2, 2019

(54) REDUCING A SIZE OF BACKUP DATA IN STORAGE

(71) Applicant: International Business Machines Corporation, Armonk, NY (US)

(72) Inventors: Tohru Hasegawa, Tokyo (JP); Hiroshi Itagaki, Yokohama (JP); Sosuke Matsui, Tokyo (JP); Shinsuke Mitsuma, Tokyo (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 15/209,942

(22) Filed: Jul. 14, 2016

(65) Prior Publication Data

US 2018/0018110 A1 Jan. 18, 2018

(51) Int. Cl.
*G06F 17/30* (2006.01)
*G06F 3/06* (2006.01)

(52) U.S. Cl.
CPC ............ *G06F 3/0619* (2013.01); *G06F 3/065* (2013.01); *G06F 3/0643* (2013.01); *G06F 3/0673* (2013.01)

(58) Field of Classification Search
CPC ...... G06F 3/0619; G06F 3/065; G06F 3/0643; G06F 3/0673; G06F 2221/0782
See application file for complete search history.

(56) References Cited

U.S. PATENT DOCUMENTS

| | | | |
|---|---|---|---|
| 2010/0293141 A1 | 11/2010 | Anand et al. | |
| 2010/0332549 A1* | 12/2010 | Nichols | G06F 17/30067 707/802 |
| 2016/0062992 A1* | 3/2016 | Chen | H04L 9/3242 707/736 |
| 2016/0196435 A1* | 7/2016 | Oh | H04W 4/21 713/193 |
| 2018/0018110 A1* | 1/2018 | Hasegawa | G06F 3/0619 |

OTHER PUBLICATIONS

"Free Online Video Editor and Maker", WeVideo, Printed Jun. 14, 2016, 8 Pages, <www.wevideo.com>.
"[New!!]~ECx to Video—Video Editing + registration release centralized management can be app", Millvi, Oct. 30, 2014, Copyright © 2008-2016 Eviry Inc., 8 pages.

* cited by examiner

*Primary Examiner* — Leslie Wong
(74) *Attorney, Agent, or Firm* — Edward P. Li

(57) ABSTRACT

A method, a computer program product, and a computer system for backing up data in a backup storage space. A computer receives a request for backing up a second data file, wherein the second data file is created from a first data file. The computer determines whether a third data file satisfies one or more of predetermined conditions for backup; wherein the third data file is generated when the second data file is created from the first data file and the third data file comprises information for creating the second data file from the first data file. In response to determining that the third data file satisfies the one or more of the predetermined conditions for backup, the computer backs up the third data file, without backing up the second data file.

18 Claims, 4 Drawing Sheets

REDUCING A SIZE OF BACKUP DATA IN STORAGE

BACKGROUND

The present invention relates generally to backup of data, and more particularly to reducing a size of backup data in a storage space.

To prevent data loss caused by an error in operation, a software fault, or a hardware fault, it becomes necessary to back up data. The amount of backup data is likely to be enormous. To reduce the amount of backup data, techniques of data compression or data deduplication have been conventionally used. The data compression is a technique to find bit strings having identical contents from target data and to replace the bit strings with short signs. The data deduplication is a technique to find blocks having identical contents from target data and to leave only one of the blocks while deleting the others. These conventional techniques produce an effect if a large number of portions with identical bit strings appear in files; otherwise, these techniques produce less effect. For example, in a case where a result of editing video materials is stored as a video work, and both the video materials and the video work are stored. In the editing operation of simply cutting unnecessary scenes, there are many identical bit strings in both the pre-edited video materials and the post-edited video work; therefore, it can be expected that the conventional techniques effectively work. However, in some cases, special effects are added to many scenes, or the video work is re-encoded for various types of resolution or codecs to be stored so that the video work can be watched by various types of equipment. In these cases, it cannot be expected that many identical bit strings exist in both the pre-edited video materials and the post-edited video work; accordingly, the conventional techniques may produce less effects.

SUMMARY

In one aspect, a method for backing up data in a backup storage space is provided. The method includes receiving, by a computer, a request for backing up a second data file, wherein the second data file is created from a first data file. The method further includes determining, by the computer, whether a third data file satisfies one or more of predetermined conditions for backup; wherein the third data file is generated when the second data file is created from the first data file, and the third data file comprises information for creating the second data file from the first data file. The method further includes backing up, by the computer, the third data file, in response to determining that the third data file satisfies the one or more of the predetermined conditions for backup; the method is without backing up the second data file.

In another aspect, a computer program product for backing up data in a backup storage space is provided. The computer program product comprises a computer readable storage medium having program code embodied therewith. The program code executable to receive, by a computer, a request for backing up a second data file, wherein the second data file is created from a first data file. The program code executable to determine, by the computer, whether a third data file satisfies one or more of predetermined conditions for backup, wherein the third data file is generated when the second data file is created from the first data file and the third data file comprises information for creating the second data file from the first data file. The program code executable to back up, by the computer, the third data file without backing up the second data file, in response to determining that the third data file satisfies the one or more of the predetermined conditions for backup.

In yet another aspect, a computer system for backing up data in a backup storage space is provided. The computer system comprises one or more processors, one or more computer readable tangible storage devices, and program instructions stored on at least one of the one or more computer readable tangible storage devices for execution by at least one of the one or more processors. The program instructions are executable to: receive, by a computer, a request for backing up a second data file, wherein the second data file is created from a first data file; determine, by the computer, whether a third data file satisfies one or more of predetermined conditions for backup, wherein the third data file is generated when the second data file is created from the first data file and the third data file comprises information for creating the second data file from the first data file; and back up, by the computer, the third data file without backing up the second data file, in response to determining that the third data file satisfies the one or more of the predetermined conditions for backup.

DETAILED DESCRIPTION

Figure 1:
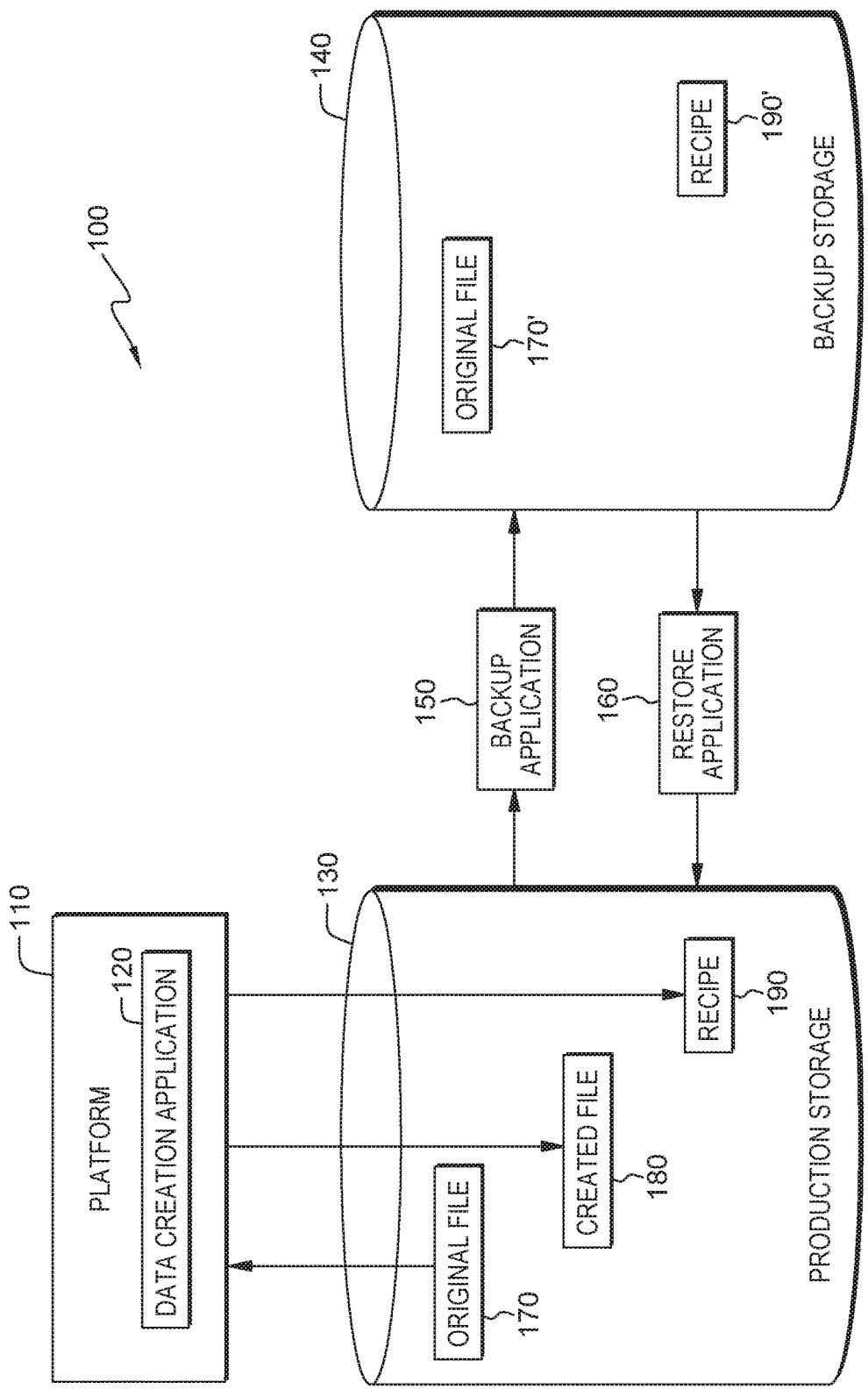
FIG. 1 is a diagram illustrating a system for reducing a size of backup data in a storage space, in accordance with one embodiment of the present invention.

FIG. 1 is a diagram illustrating system 100 for reducing a size of backup data in a storage space, in accordance with one embodiment of the present invention. In the embodiment of the present invention, system 100 includes platform 110 which further includes data creation application 120. Platform 110 is configured with middleware and an operation system, and platform 110 provides an environment where an application is executed. It is noted that a version of middleware or an operating system of the platform affects behavior of data creation application 120. In the embodiment of the present invention, system 100 further includes production storage 130 which includes original file 170, created file 180, and recipe 190. Data creation application 120 reads data from original file 170, processes the read data, and writes the processed data to created file 180. Data creation application 120 generates recipe 190 when it generates created file 180. Recipe 190 is associated with created file 180. A simple example of the association may use a name of a reserved path; for example, a recipe that creates/my_folder/my_data.bin is written into/.reserved_for_recipe/ my_folder/my_data.bin. Recipe 190 includes information for data creation application 120 to generate created file 180 from original file 170. Data creation application 120 creates created file 180 from original file 170 and recipe 190. Recipe 190 has a portion that is unique to a respective one of applications and a portion that is common to all applications. The portion that is common to all applications includes the following information. (1) Information for uniquely identifying original file 170 and created file 180. This information does not only include a filename such as a path name but also includes information indicating a version such as a time stamp. (2) Information about a cost of creating created file 180 from original file 170. The cost means a value representing resources required for creating created file 180; for example, the cost is equal to CPU performance x time spent on the creation of created file 180. (3) Information for uniquely identifying the creation application (i.e., data creation application 120). The information for uniquely identifying the application includes not only the name but also version information of the application. (4) Information for uniquely identifying platform 110. The information for uniquely identifying platform 110 includes information of the environment where data creation application 120 is operated, for example a name and a version of middleware or an operating system.

In the embodiment of the present invention, system 100 further includes backup application 150 and backup storage 140. Backup application 150 backs up original file 170 to backup storage 140 if original file 170 has not been backed up; the backup file of original file 170 is original file 170' on backup storage 140. If recipe 190 satisfies one or more of predetermined backup conditions, backup application 150 backs up recipe 190 on backup storage 140, without backing up created file 180. The backup file of recipe 190 on backup storage 140 is recipe 190'. If recipe 190 does not satisfy the one or more of the predetermined backup conditions, backup application 150 backs up created file 180 on backup storage 140.

In the embodiment of the present invention, backup application 150 carries out the following condition determination for each of the backup target files. If one or more of conditions are true, a recipe associated with a backup target file is backed up instead of the backup target file itself; otherwise, the backup target file itself is backed up. The conditions are as follows. (1) There exists a recipe associated with the backup target file. (2) The original file corresponding to a version described in the recipe has already been backed up or is the backup target file. (3) The version of a created file described in the recipe coincides with the version of the backup target file. (4) The size of the recipe is sufficiently smaller than the size of the backup target file. (5) The cost described in the recipe does not exceed a predetermined threshold. For example, if the time spent for generating the created file exceeds two hours, the backup target file itself is backed up. In the embodiment of the present invention, it is assumed that all versions of the platforms and applications used in the past are backed up.

In the embodiment of the present invention, in response to determining that a recipe having no consistency is found on production storage 130, backup application 150 deletes the recipe on production storage 130. The recipe has no consistency when any of the conditions is met. (1) There exists no created file associated with the recipe; for example, the created file is deleted or the path name is changed. (2) The version of a created file associated with the recipe does not coincide with the version of a created file described in the recipe. (3) There exists no original file described in the recipe; for example, the original file is deleted or the path name is changed. (4) The version of the original file associated with the recipe does not coincide with the version of the original file described in the recipe.

In the embodiment of the present invention, system 100 further includes restore application 160. A function of restore application 160 is to restore files from backup storage 140 to production storage 130. Restore application 160 restores recipe 190' from backup storage 140 to production storage 130. Original file 170' is the backup file of original file 170 and it is described in recipe 190'. According to the description of the original file in recipe 190', restore application 160 restores original file 170' from backup storage 140 to production storage 130. Recipe 190' on backup storage 140 is the backup file of recipe 190 which is generated by data creation application 120 on platform 110; data creation application 120 and platform 110 are described in recipe 190'. The restored recipe includes information for data creation application 120 to create the created file. On platform 110, data creation application 120 restores the created file from the restored original file, according to the description in the restored recipe.

In other embodiments of the present invention, all applications may have following functions to maintain consistency of a recipe. When an application deletes a file, the application may also delete a recipe that is associated with the file and designates the file as an original file. When an application changes a path name of a file, the application may rewrite a recipe that is associated with the file and designates the file as an original file.

Figure 2:
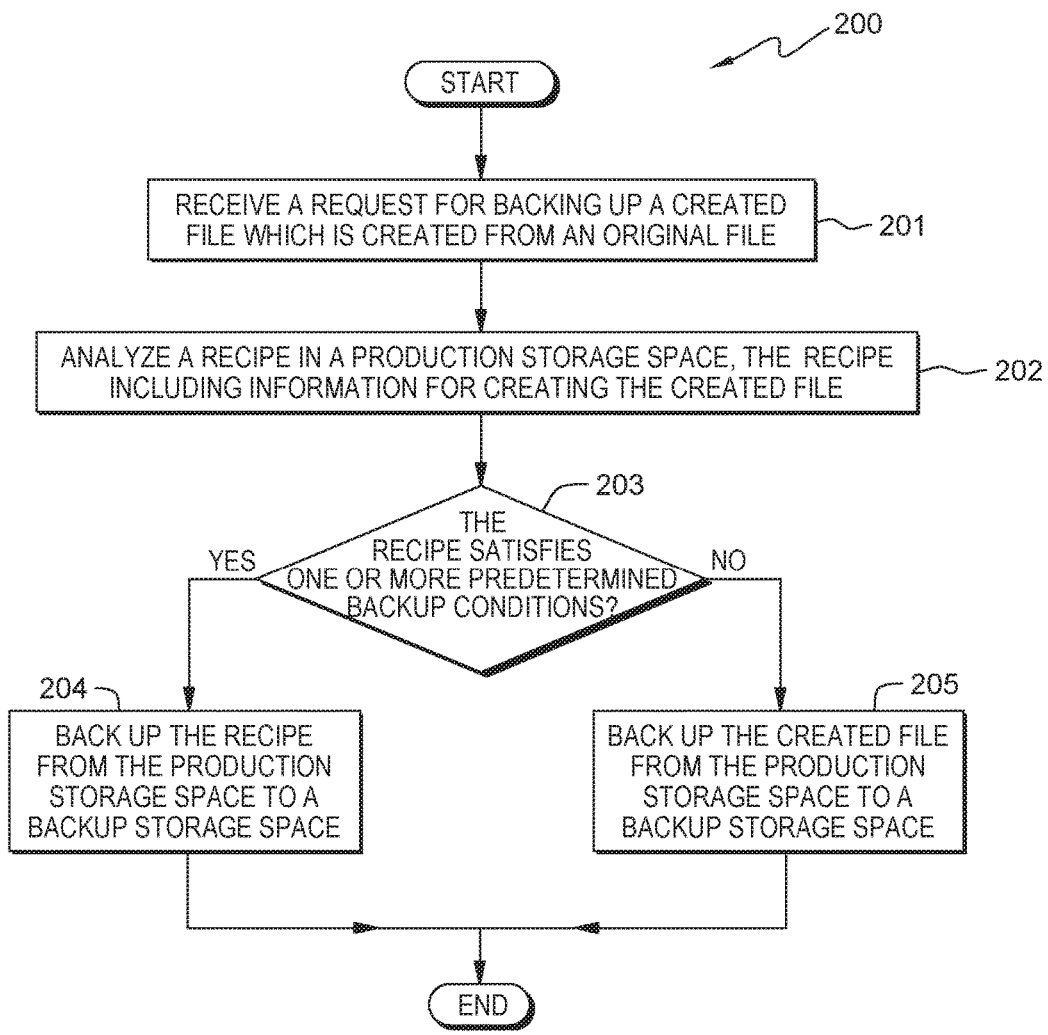
FIG. 2 is a flowchart showing operational steps for backing up data from a production storage space to a backup storage space, in accordance with one embodiment of the present invention.

FIG. 2 is flowchart 200 showing operational steps for backing up data from a production storage space to a backup storage space, in accordance with one embodiment of the present invention. In the embodiment of the present invention, the operational steps are implemented by backup application 150 shown in FIG. 1. At step 201, backup application 150 receives a request for backing up a created file (e.g., created file 180 shown in FIG. 1). In the embodiment of the present invention, the created file is created by a data processing application (e.g., data creation application 120 shown in FIG. 1) from an original file (e.g., original file 170 shown in FIG. 1). At step 202, backup application 150 analyzes a recipe (e.g., recipe 190 shown in FIG. 1) in a production storage space (e.g., production storage 130 shown in FIG. 1). The recipe is generated when the created file is created from the original file. The recipe includes information for creating the created file from the original file. The information in the recipe is described in a previous paragraph of this document. At step 203, backup application 150 determines whether the recipe satisfies one or more of predetermined backup conditions. The one or more of the predetermined backup conditions are described in in a previous paragraph of this document. In response to determining that the recipe satisfies the one or more of the predetermined backup conditions (YES branch of step 203), at step 204, backup application 150 backs up the recipe from the production storage space to a backup storage space (e.g., backup storage 140 shown in FIG. 1), without backing up the created file. In response to determining that the recipe does not satisfy the one or more of the predetermined backup conditions (NO branch of step 203), at step 205, backup application 150 backs up the created file from the production storage space to the backup storage space.

Figure 3:
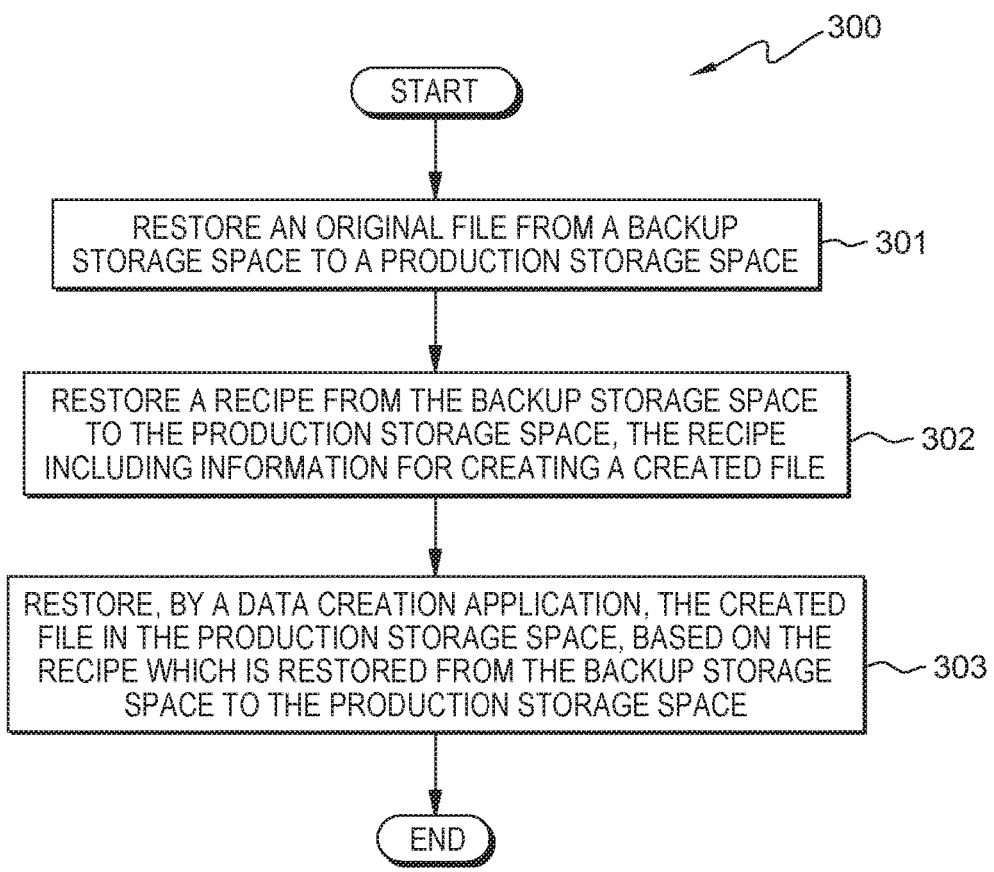
FIG. 3 is a flowchart showing operational steps for restoring data from a backup storage space to a production storage space, in accordance with one embodiment of the present invention.

FIG. 3 is flowchart 300 showing operational steps for restoring data from a backup storage space to a production storage space, in accordance with one embodiment of the present invention. In the embodiment of the present invention, the operational steps are implemented by restore application 160 and data creation application 120 shown in FIG. 1. At step 301, restore application 160 restore an original file (e.g., original file 170' shown in FIG. 1) from a backup storage space (e.g., backup storage 140 shown in FIG. 1) to a production storage space (e.g., production storage 130 shown in FIG. 1). At step 302, restore application 160 restore a recipe (e.g., recipe 190' shown in FIG. 1) from the backup storage space to the production storage space. The recipe includes information for creating the created file from the original file. The information in the recipe is described in a previous paragraph of this document. Note that the sequence of steps 301 and 302 may be switched. In other embodiments, restore application 160 may execute step 302 first and then step 301. At step 303, data creation application 120 restores a created file in the production storage space, based on the recipe which is restored at step 302 from the backup storage space to the production storage space.

An experiment to compare the present invention with a conventional data compression technique was conducted. The results are as follows.

An original file was a HD video file with a name of src.mp4; its size was 9,202 KB, codec was H264 MPEG-4 AVC, length was 8 second, resolution was 1280×720, and bit rate was 9 Mbps. Two copies of the original file were created: src_copy1.mp4, src_copy2.mp4.

The original file (src.mp4) was read by a video editing application to generate created file 1. The video editing application changed the resolution, the bit rate, and the codec of src.mp4, without any editing. Created file 1 was a SD video for DVD players and had a filename of out_1.mpg. For out_1.mpg, the size was 4,383 KB, the codec was MPGE-2, the length was 8 second, the resolution was 720×480, and the bit rate was 4 Mbps. In recipe 1, the video editing application stored information for creating created file 1 (out_1.mpg). Recipe 1 had a filename of out_1.dat and a size of 38 KB.

Further, the original file (src.mp4) was read by a video editing application to generate created file 2. The video editing application changed the resolution and the bit rate, without any editing. Created file 2 was a SD video for mobile devices and had a filename of out_2.mp4. For out_2.mpg, the size was 2,162 KB, the codec was H264 MPEG-4 AVC, the length was 8 second, the resolution was 720×480, and the bit rate was 2 Mbps. In recipe 2, the video editing application stored information for creating created file 2 (out_2.mpg). Recipe 2 had a filename of out_2.dat and a size of 38 KB.

As an example of the conventional data compression technique producing an effect, the original file (src.mp4) and 2 copies thereof (src_copy1.mp4, src_copy2.mp4), 3 files in total, were compressed by 7-zip to generate a compressed file (src_x3.7z). 7-zip has a function of increasing the compressing effect by finding bit strings having the identical contents over plural files. The function of 7-zip is referred to as solid compression. The three files were compressed to about one third the original size of the three original files, and thus the data compression technique produced an effect. The compressed file (src_x3.7z) had a file size of 9,316 KB. The original size of the three original file (src.mp4, src_copy1.mp4, src_copy2.mp4) was 27,606 KB.

As an example of the conventional data compression technique producing less effect, the original file (src.mp4), the created file 1 (out_1.mpg) and the created file 2 (out_2.mp4) were compressed by 7-zip to generate a new file (src+out_1+out_2.7z). The files were not compressed at all but the size was slightly increased, and the data compression technique produces no effect. The original size of the three original file (src.mp4, out_1.mpg, out_2.mp4) was 15,747 KB. The new file (src+out_1+out_2.7z) generated with 7-zip had a size of 17,772 KB.

According to the experiment, to back up the original file (src.mp4), the created file 1 (out_1.mpg), and the created file 2 (out_2.mp4) using the data compression technique (7-zip), the file src+out$_{b\ 1}$+out_2.7z generated by 7-zip needed a storage space of 17,772 KB. However, using the technique in the present invention, a storage space was calculated as follows:

$$\text{src.mp4+out\_1.dat+out\_2.dat}+\alpha=9{,}278\text{ KB}+\alpha\text{KB}$$

α was the portion of the recipe common to applications added by implementation of the present invention. The information included in α was at the order of several KB to several tens of KB. It was indicated that reducing a size of backup data in a storage space was accomplished by the present invention.

Figure 4:
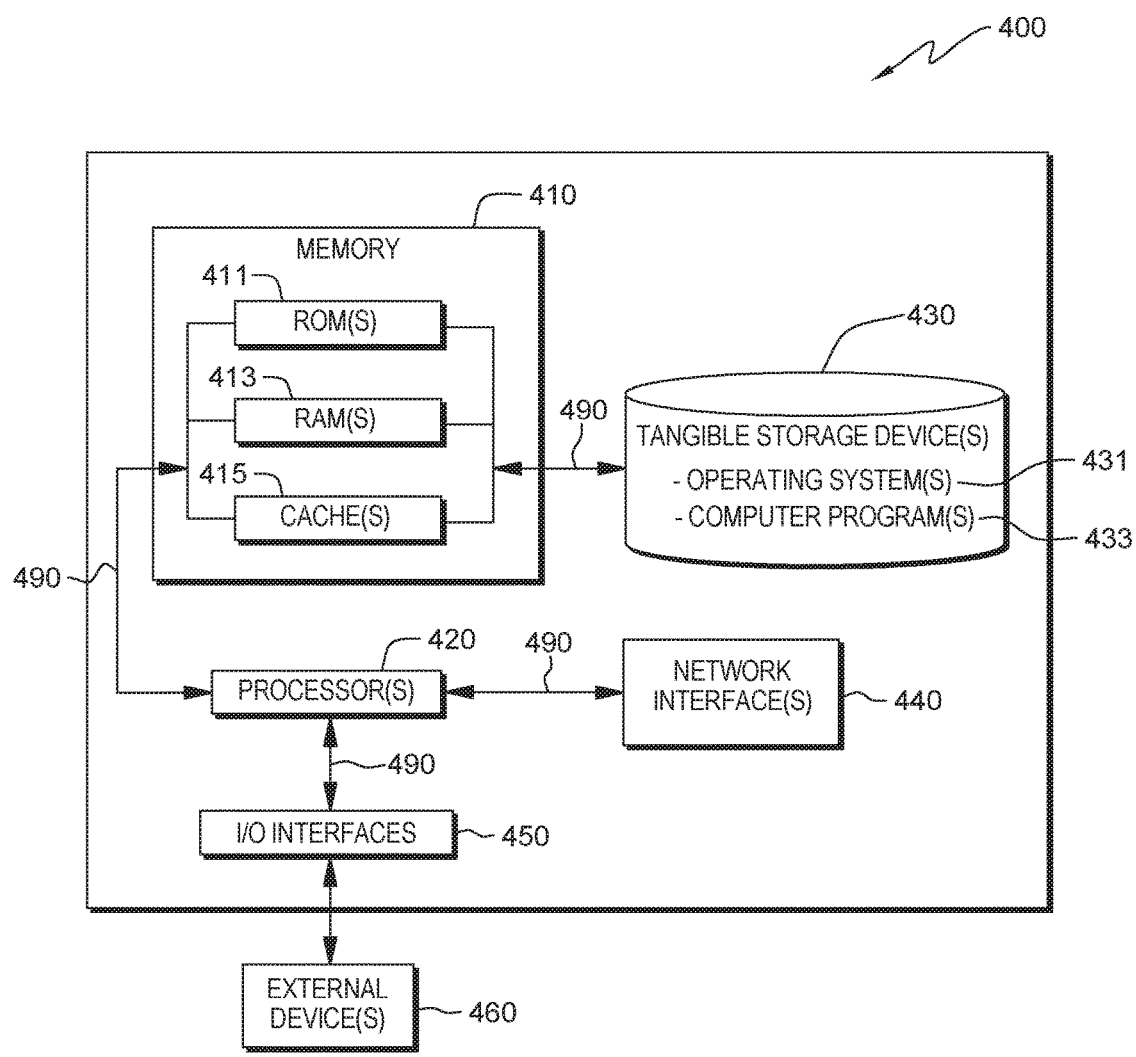
FIG. 4 is a diagram illustrating components of a device hosting a platform, a data creation application, a backup application, a restore application, a production storage space, and/or a backup storage space (all shown in FIG. 1), in accordance with one embodiment of the present invention.

FIG. 4 is a diagram illustrating components of a device hosting platform 110, data creation application 120, backup application 150, restore application 160, production storage space 130, and/or backup storage space 140 (all shown in FIG. 1), in accordance with one embodiment of the present invention. It should be appreciated that FIG. 4 provides only an illustration of one implementation and does not imply any limitations with regard to the environment in which different embodiments may be implemented. The device may be any electronic device or computing system capable of receiving input from a user, executing computer program instructions, and communicating with another electronic device or computing system via a network. For example, the device may be a mobile phone, tablet, or laptop.

Referring to FIG. 4, device 400 includes processor(s) 420, memory 410, and tangible storage device(s) 430. In FIG. 4, communications among the above-mentioned components of device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430. Platform 110, data creation application 120, backup application 150, restore application 160, production storage space 130, and/or backup storage space 140 reside on one or more computer readable tangible storage device(s) 430. Device 400 further includes I/O interface(s) 450. I/O interface(s) 450 allows for input and output of data with external device(s) 460 that may be connected to device 400. Device 400 further includes network interface(s) 440 for communications between device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for backing up data in a backup storage space, the method comprising:
   receiving, by a computer, a request for backing up a second data file, the second data file created from a first data file;
   determining, by the computer, whether a third data file satisfies one or more of predetermined conditions for backup, the third data file generated when the second data file is created from the first data file, the third data file comprising information for creating the second data file from the first data file; and
   backing up, by the computer, the third data file, without backing up the second data file, in response to determining that the third data file satisfies the one or more of the predetermined conditions for backup.

2. The method of claim 1, further comprising:
   restoring, by the computer, the first data file;
   restoring, by the computer, the third data file;
   restoring, by the computer, the second data file by creating the second data file from the first data file, based on the information in the third data file.

3. The method of claim 1, further comprising:
   backing up, by the computer, the first data file, in response to determining that the first data file has not been backed up.

4. The method of claim 1, wherein the information in the third data file comprises information for identifying the first data file and the second data file, information of a cost of creating the second data file from the first data file, and information for identifying a data creation application that create the second date file and a platform where the data creation application runs.

5. The method of claim 1, wherein the predetermined conditions for backup comprise:
   whether there exists the third data file associated with the second data file;
   whether the first data file described in the third data file has been backed up or is to be backed up;
   whether a version described in the third data file coincides with a version of the second data file;
   whether a size of the third data file is smaller than a size of the second data file; and
   whether a cost of creating the second data file from the first data file does not exceed a predetermined threshold.

6. The method of claim 1, further comprising:
   determining, by the computer, consistency of the third data file;
   wherein the computer determines whether there exists the second data file associated with the third data file;
   wherein the computer determines whether a version of the second data file associated with the third data file coincides with a version of the second data file described in the third data file;
   wherein the computer determines whether there exists the first data described in the third data file; and
   wherein the computer determines whether a version of the first data file associated with the third data file coincides with a version of the first data file described in the third data file.

7. A computer program product for backing up data in a backup storage space, the computer program product comprising a computer readable storage medium having program code embodied therewith, the program code executable to:
   receive, by a computer, a request for backing up a second data file, the second data file created from a first data file;
   determine, by the computer, whether a third data file satisfies one or more of predetermined conditions for backup, the third data file generated when the second data file is created from the first data file, the third data file comprising information for creating the second data file from the first data file; and
   back up, by the computer, the third data file, without backing up the second data file, in response to determining that the third data file satisfies the one or more of the predetermined conditions for backup.

8. The computer program product of claim 7, further comprising the program code executable to:
   restore, by the computer, the first data file;
   restore, by the computer, the third data file;
   restore, by the computer, the second data file by creating the second data file from the first data file, based on the information in the third data file.

9. The computer program product of claim 7, further comprising the program code executable to:
   back up, by the computer, the first data file, in response to determining that the first data file has not been backed up.

10. The computer program product of claim 7, wherein the information in the third data file comprises information for identifying the first data file and the second data file, information of a cost of creating the second data file from the first data file, and information for identifying a data creation application that create the second date file and a platform where the data creation application runs.

11. The computer program product of claim 7, wherein the predetermined conditions for backup comprise:
    whether there exists the third data file associated with the second data file;
    whether the first data file described in the third data file has been backed up or is to be backed up;
    whether a version described in the third data file coincides with a version of the second data file;
    whether a size of the third data file is smaller than a size of the second data file; and
    whether a cost of creating the second data file from the first data file does not exceed a predetermined threshold.

12. The computer program product of claim 7, further comprising the program code executable to:
    determine, by the computer, consistency of the third data file;
    wherein the computer determines whether there exists the second data file associated with the third data file;
    wherein the computer determines whether a version of the second data file associated with the third data file coincides with a version of the second data file described in the third data file;
    wherein the computer determines whether there exists the first data described in the third data file; and
    wherein the computer determines whether a version of the first data file associated with the third data file coincides with a version of the first data file described in the third data file.

13. A computer system for backing up data in a backup storage space, the computer system comprising:
    one or more processors, one or more computer readable tangible storage devices, and program instructions stored on at least one of the one or more computer readable tangible storage devices for execution by at least one of the one or more processors, the program instructions executable to:
    receive, by a computer, a request for backing up a second data file, the second data file created from a first data file;
    determine, by the computer, whether a third data file satisfies one or more of predetermined conditions for backup, the third data file generated when the second data file is created from the first data file, the third data file comprising information for creating the second data file from the first data file; and
    back up, by the computer, the third data file, without backing up the second data file, in response to determining that the third data file satisfies the one or more of the predetermined conditions for backup.

14. The computer system of claim 13, further comprising the program instructions executable to:
    restore, by the computer, the first data file;
    restore, by the computer, the third data file;
    restore, by the computer, the second data file by creating the second data file from the first data file, based on the information in the third data file.

15. The computer system of claim 13, further comprising the program instructions executable to:

back up, by the computer, the first data file, in response to determining that the first data file has not been backed up.

16. The computer system of claim 13, wherein the information in the third data file comprises information for identifying the first data file and the second data file, information of a cost of creating the second data file from the first data file, and information for identifying a data creation application that create the second date file and a platform where the data creation application runs.

17. The computer system of claim 13, wherein the predetermined conditions for backup comprise:

whether there exists the third data file associated with the second data file;

whether the first data file described in the third data file has been backed up or is to be backed up;

whether a version described in the third data file coincides with a version of the second data file;

whether a size of the third data file is smaller than a size of the second data file; and whether a cost of creating the second data file from the first data file does not exceed a predetermined threshold.

18. The computer system of claim 13, further comprising the program instructions executable to:

determine, by the computer, consistency of the third data file;

wherein the computer determines whether there exists the second data file associated with the third data file;

wherein the computer determines whether a version of the second data file associated with the third data file coincides with a version of the second data file described in the third data file;

wherein the computer determines whether there exists the first data described in the third data file; and wherein the computer determines whether a version of the first data file associated with the third data file coincides with a version of the first data file described in the third data file.

* * * * *